Patented Dec. 22, 1936

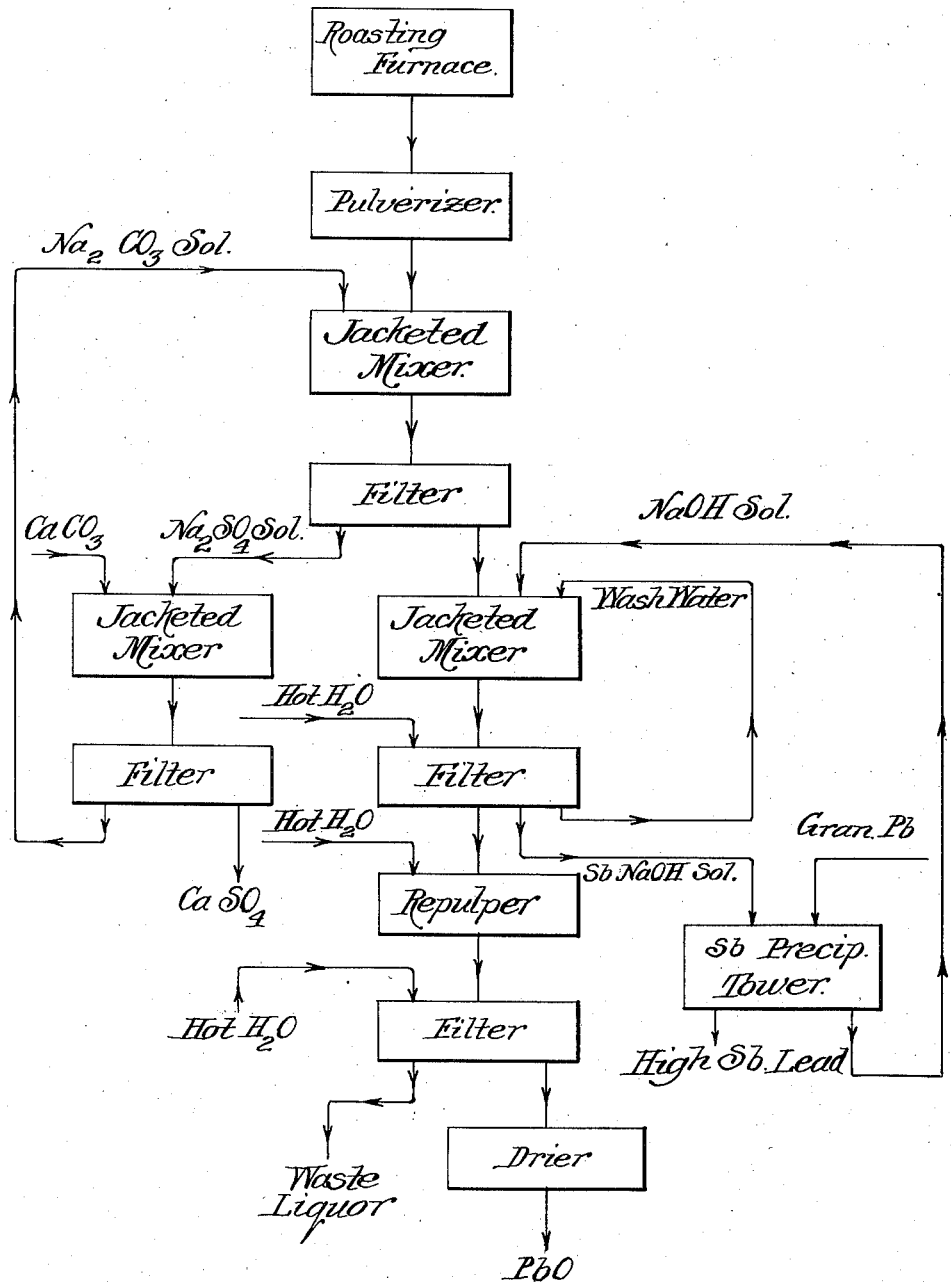

2,065,408

UNITED STATES PATENT OFFICE 2,065,408

LEAD PRODUCT

Svend S. Svendsen, Madison, Wis., assignor to Basic Metals Corporation, Chicago, Ill., a corporation of Delaware Application July 5, 1932, Serial No. 620,962

16 Claims. (Cl. 23—146)

This invention relates to the production of substantially pure lead oxides and, more particularly, to the treatment of impure oxidic lead, for example, material containing antimony and metallic lead.

This application is a continuation in part of my application Serial No. 305,596 filed September 12, 1928, issued as Patent 1,898,405.

According to the invention, the oxidic material of lead battery plates, for example, may be converted into pure lead oxide by first removing the metallic lead present or by converting it into its oxides and then removing the antimony. The larger metallic lead particles may be removed by screening or by air flotation and the finer particles, by froth flotation or oxidation. Oxidation of metallic lead may be brought about by roasting or by heating it in an alkali solution in the presence of oxygen.

The antimony in the material may likewise be eliminated by oxidation and dissolution. Oxidic antimony may be dissolved in an ammonium chloride solution, an aqueous solution of sugar, citric acid, alkali carbonate or caustic alkali. An aqueous caustic alkali solution is preferably employed to dissolve the oxidic antimony and compounds of the nature of $2Na_2O.3Sb_2O_3$ and $Na_2O.2Sb_2O_3$ are formed which are soluble in caustic soda solutions. $2Na_23Sb_2O_3$ is soluble in a 10% caustic soda solution but a 20% solution is preferably employed to dissolve $Na_2O.2Sb_2O_3$.

In the treatment of oxidic materials of lead battery plates, lead sulfate is eliminated by decomposing it to sulfuric acid and removing sulfuric acid by any of the methods known to the art, for example, by treating it with a hot or cold solution of alkali carbonate.

If barium sulfate is present in the material to be treated, it may be converted into barium carbonate simultaneously with the conversion of the lead sulfate. If a carbonate solution containing an excess of caustic alkali is employed, the oxidic antimony may be dissolved simultaneously with the sulfate treatment, in the absence of metallic lead. I have found that the presence of metallic lead substantially prevents the dissolution of antimony.

In the presence of caustic alkali, the barium carbonate formed reacts with lead oxide in the caustic alkali solution to form barium hydroxide and lead carbonate, as shown in the following equations:

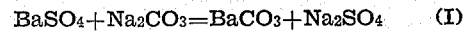
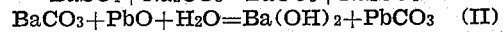

$$BaSO_4+Na_2CO_3=BaCO_3+Na_2SO_4 \quad (I)$$
$$BaCO_3+PbO+H_2O=Ba(OH)_2+PbCO_3 \quad (II)$$

Barium hydroxide is but slightly soluble in an alkali solution, but may be readily dissolved in warm water after the alkali solution has been removed.

The lead peroxide in the battery plate material when treated with caustic alkali goes into solution as alkali plumbite and alkali plumbate from which a lead plumbate is precipitated which may be satisfactorily employed as a lead pigment. The reaction is as expressed in the following equation:

$$PbO+PbO_2=Pb.PbO_3=Pb_2O_3 \quad (III)$$

Any organic material present in the battery plate material is dissolved and removed with the alkali solution.

The invention will be readily understood from the following example and the accompanying flow sheet.

Oxidic lead material is preferably pulverized and screened to remove the larger metallic particles. Minute metallic particles may either be left in the material or substantially removed by air separation. The material is then heated in the presence of air at a temperature below the sintering temperature. The material is then treated with a hot caustic soda solution containing at least ¾ of a pound of sodium hydroxide, per gallon of liquid. If metallic sulfates are present in the material to be treated, sufficient sodium carbonate is added to the caustic soda solution to stoichiometrically convert the metallic sulfates into sodium sulfate and metallic carbonate. The reactions are preferably carried out at temperatures of about 100° C. The material is then filtered while hot and washed, first with a hot alkali solution and then with water. If barium hydroxide is formed in the reaction, caustic alkali solution is employed in the washing, and the filter cake is repulped in hot water, filtered and washed with hot water. Any barium carbonate remaining may be dissolved by adding ammonium chloride in the repulping step.

The lead oxide compound is then dried and may be calcined to form the desired lead oxide.

As previously pointed out, a feature of the invention is the fact that the alkaline filtrate may be regenerated by heating it in a calcium carbonate solution, preferably at temperatures above 100° C. which precipitates the sulfates present as calcium sulfates, as illustrated in the following equation:

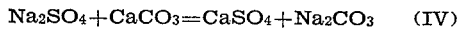
$$Na_2SO_4 + CaCO_3 = CaSO_4 + Na_2CO_3 \quad (IV)$$

The alkaline solution is then treated with granulated lead to remove the antimony, as set forth below:

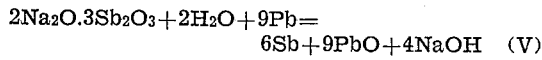
$$2Na_2O \cdot 3Sb_2O_3 + 2H_2O + 9Pb = 6Sb + 9PbO + 4NaOH \quad (V)$$

The lead oxide formed is dissolved in the alkali solution and it is ready to be reused in treating a further charge of impure lead oxidic material.

A modification of the above-described process is to remove the minute metallic particles by froth flotation. The operation may be suitably carried out by treating the impure oxidic material with a hot solution of sodium carbonate containing sufficient caustic soda to decompose any metallic sulfates present and to remove an oxide film on the metallic particles. The material undergoing treatment is then placed in a flotation apparatus and flotation reagents suitable for use in an alkaline solution are added. The metallic particles are carried to the surface and removed with the froth. After the metallic particles have been substantially completely removed, the material is heated with a caustic alkali solution, washed and calcined, as heretofore described.

As a specific example of the process above described, the following may be given, using lead storage battery plates as the raw material. It is to be understood that the invention is not limited to the specific materials or details of this example.

Storage battery plates with or without lugs are placed in a rotating drum and a sodium carbonate solution in excess of the quantity stoichiometrically required to convert the sulfate compounds present into sodium sulfate and metallic carbonate is added.

In my prior application, Serial No. 305,596 I have described a process of converting the lead sulfate in scrap battery plates into lead carbonate by treating the lead sulfate with an aqueous solution of an alkali metal carbonate and a small amount of lead solvent. In like manner in the present invention I have found it desirable to separate the sulfates from scrap battery plates in a revolving drum and at the same time treat the sulfates with a solution of caustic soda, preferably in the presence of a catalyst, for example, sodium acetate.

The reaction may very well be carried on in apparatus described in the prior application referred to, which consists of a drum provided with a ribbed interior, means of injecting steam, and a door for the introduction of reaction materials and the withdrawal of the products of the reaction. Nine pounds of soda ash is sufficient to treat one hundred pounds of battery plates and the reaction is satisfactorily carried on in a 10% carbonate solution, but a more concentrated or a weaker solution may be employed. The drum should not be filled more than ⅔ of its capacity. A temperature of about the boiling point of water is suitable and the mixture in the rotating drum may be maintained at that temperature by means of injected steam. The time of the reaction will vary depending on the moistness of the plates and other conditions. On an average, the reaction takes about thirty to sixty minutes.

A froth containing a considerable amount of finely divided metallic lead particles and some organic material is formed during the reaction and may be drawn off with the supernatant liquid. Lead particles may be settled from the liquid in a settling tank and the liquid discarded or preferably treated with calcium carbonate, as heretofore described, and reused in the reaction.

After the heavy lead particles have settled in the bottom of the drum, they are removed and the coarser metallic particles separated by a screen. The fine metallic material is then separated from the oxidic material either by screening through an 80 to 100 mesh screen, keeping the material suspended in water, or by following the well-known ore concentration practice of jigging and table-treating.

After the above-described mechanical treatment, some metallic lead usually remains in the oxidic material and the material is placed in a tank, preferably made of a non-corrosive steel alloy and provided with agitating mechanism. A caustic soda solution in the ratio of 1½ to 2 pounds of caustic soda, per gallon of liquid, is added and the remaining lead particles are oxidized by blowing air through the solution, preferably at a temperature of 100° C. The oxidation operation usually takes from one to one and one-half hours.

After the metallic lead is removed, the antimony present is readily dissolved in the caustic solution. Air is usually blown through the material for an hour to an hour and a half and the material further heated in the caustic solution for an additional thirty to sixty minutes.

As previously described, the barium carbonate is converted to barium hydroxide during this reaction and the lead peroxide present reacts with lead monoxide to form a lead plumbate. The color of the material changes during the treatment from a chocolate brown to a dirty yellow and then gradually to a dark golden orange. The shade of orange depends on the duration of the treatment, prolonged treatment giving a darker and cleaner color.

A weak caustic alkali solution, for example, less than 10%, requires prolonged treatment to change the color, while a 10 to 20% solution effects the color changes in about thirty to thirty-five minutes. In a concentrated caustic soda solution, for instance, a 50% solution, a yellowish gray lead oxide material is produced which, after prolonged heating in the caustic solution, precipitates a red variety of lead monoxide. The grayish tinge may be changed to orange by diluting the caustic solution.

The caustic material is then filtered and washed, first with a caustic soda solution and then with hot water. It is then repulped and washed again with hot water to remove the barium hydroxide present. The washed filter cake, which contains a considerable amount of lead carbonate, as well as the lead oxides, is dried at 100° to 120° C. and may be used very satisfactorily as a pigment since it has a high tinting strength and hiding power. The caustic liquid may be filtered through granular lead, as previously described, and reused.

The filter cake material may be converted into lead oxide by calcining. The material is preferably sifted before it is calcined to retain its particle size. This material is excellent for producing red lead, since it is very susceptible to heat treatment. At 560° to 600° C. an orange-yellow lead monoxide is formed. At about 620° to 640°, an intense lemon-yellow oxide is produced.

While I have described in considerable detail the specific form of apparatus which I find well adapted to the carrying out of my process, as well as the details of a particular commercial process in accordance with the invention, it will be understood that this is illustrative only and for the purpose of making clear the nature and mode of applying the invention and that the invention is not to be regarded as limited to scope to the illustrative details given, except in so far as such limitation is included within the terms of the accompanying claims, in which it is my intention to claim all novelty inherent in my invention as broadly as possible in view of the prior art.

What I regard as new and desire to secure by Letters Patent is:

1. The method of producing a lead oxide material substantially completely free from antimony from an oxidic lead material containing antimony and metallic lead which comprises substantially completely removing said metallic lead from said oxidic lead material in aqueous suspension and removing the antimony by dissolution in a caustic alkali solution.

2. The method of producing a lead oxide material substantially completely free from antimony from an oxidic lead material containing antimony and metallic lead which comprises substantially completely removing said metallic lead from said oxidic lead material by froth flotation and subsequently removing the antimony by dissolution in a caustic alkali solution.

3. The method of producing a lead oxide material substantially completely free from antimony from an oxidic lead material containing antimony and metallic lead which comprises substantially completely oxidizing said metallic lead with air and subsequently removing the antimony by dissolution in a caustic alkali solution.

4. The method of producing a lead oxide material substantially completely free from antimony from an oxidic lead material containing antimony and metallic lead which comprises substantially completely oxidizing said metallic lead by air while contacting said lead oxide material with a caustic solution.

5. The method of producing a lead oxide material substantially completely free from antimony from an oxidic lead material containing antimony and metallic lead which comprises suspending said lead material in a heated caustic alkali solution and contacting said solution with air, thereby substantially completely oxidizing said metallic lead, and subsequently removing the antimony.

6. The method of producing a lead oxide material substantially completely free from antimony from an oxidic lead material containing antimony and metallic lead which comprises oxidizing the metallic particles of said oxidic lead material suspended in a hot alkali solution by the injection of air into said suspension and dissolving the antimony in said hot alkali solution.

7. The method of removing antimony from an antimonious oxidic lead material substantially free from metallic lead which comprises heating said material in an aqueous caustic alkali solution to form an antimonious oxidic alkali compound and dissolving said antimonious alkali compound in a caustic alkali solution containing at least ¾ pound caustic alkali per gallon of liquid.

8. The method of removing antimony from an antimonious oxidic lead material substantially free from metallic lead which comprises heating said material in an aqueous caustic alkali solution to form an antimonious oxidic alkali compound and dissolving said antimonious alkali compound in a caustic alkali solution containing 1.5 to 2 lbs. free caustic alkali per gallon of liquid.

9. The method of producing a lead oxide material substantially completely free from antimony from an oxidic lead material containing antimony and metallic lead which comprises substantially completely removing said metallic lead from said oxidic lead material by passing air through said material while it is suspended in a heated caustic alkali solution of a strength of at least ¾ lbs. of caustic alkali per gallon of liquid and subsequently dissolving the antimony in said caustic alkali solution.

10. The method of producing a lead oxide material substantially completely free from antimony from an oxidic lead material containing antimony and metallic lead which comprises substantially completely removing said metallic lead from said oxidic lead material by suspending said material in an aqueous caustic soda solution and contacting said material with oxygen by passing air through the caustic soda solution in which said oxidic lead material is suspended, and subsequently dissolving the antimony from said oxidic lead material by dissolution in the aqueous caustic soda solution.

11. The method of removing barium sulfate from an oxidic lead material containing same which comprises treating said material with alkali carbonate and caustic alkali in aqueous solution in the presence of lead oxide in solution and subsequently dissolving the barium hydroxide thus formed.

12. The method of converting barium carbonate into barium hydroxide which comprises heating said carbonate in an aqueous caustic alkali solution in the presence of oxide of lead dissolved in said caustic solution.

13. The method of removing barium sulfate from an oxidic lead material containing same which comprises heating said material in an aqueous solution of alkali carbonate, heating said alkali carbonate-treated material in a caustic alkali solution and subsequently washing said alkali-treated material with water.

14. The method of producing a lead oxide material substantially free from foreign matter from lead storage battery plates from which the metallic part is incompletely removed which comprises heating said part of the battery plates in the presence of air to substantially completely convert said metallic lead to its oxides, heating said oxidized battery plate material in a solution of caustic alkali containing at least ¾ of a pound caustic alkali per gallon of liquid and alkali carbonate at least stoichiometrically sufficient to convert sulfuric acid compounds present into alkali sulfate and metallic carbonates, removing said alkali solution and subsequently removing barium present by dissolution of the barium hydroxide formed in the operation in water.

15. As a cyclic process, the method of producing a lead oxide material substantially free from foreign matter from lead storage battery plates from which the metallic lead has been substantially removed, which comprises heating said battery plate material in powdered form in an aqueous solution containing sodium carbonate in a quantity stoichiometrically sufficient to convert the sulfuric acid compounds present into sodium sulfate and metallic carbonates, heating the material in a caustic soda solution containing at least ¾ of a pound caustic soda per gallon of liquid, removing said alkali solutions from the material, regenerating the sodium carbonate in said removed soda solution by heating with calcium carbonate, removing antimony from said renewed caustic soda solution by contacting with metallic lead, and subsequently reusing said regenerated solutions in the treatment of the battery plate material.

16. As a cyclic process, the method of producing a lead oxide material substantially free from foreign matter from lead storage battery plates, which comprises tumbling said plates in a rotary drum in a heated aqueous sodium carbonate solution, removing the soda solution, treating said soda solution with calcium carbonate and returning said treated solution to the battery plate treatment, separating the metallic from the oxidic part of said treated battery plates, passing air through said oxidic part while suspended in a caustic soda solution, heating the material in said caustic solution, removing said caustic soda solution, contacting said solution with metallic lead and reusing said caustic solution to treat said battery plate material.

SVEND S. SVENDSEN.